US012801924B2

(12) United States Patent
Jiang et al.

(10) Patent No.: US 12,801,924 B2
(45) **Date of Patent: *Nov. 17, 2026**

(54) SUBSTITUTIONAL QUALITY FACTOR LEARNING FOR QUALITY-ADAPTIVE NEURAL NETWORK-BASED LOOP FILTER

(71) Applicant: TENCENT AMERICA LLC, Palo Alto, CA (US)

(72) Inventors: Wei Jiang, Sunnyvale, CA (US); Wei Wang, Palo Alto, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 932 days.

This patent is subject to a terminal disclaimer.

(21) Appl. No.: 17/741,703

(22) Filed: May 11, 2022

(65) Prior Publication Data

US 2022/0383554 A1 Dec. 1, 2022

Related U.S. Application Data

(60) Provisional application No. 63/190,109, filed on May 18, 2021.

(51) Int. Cl.
*G06N 3/08* (2023.01)
*G06N 3/084* (2023.01)
(Continued)

(52) U.S. Cl.
CPC ........... *G06N 3/084* (2013.01); *G06N 3/0985* (2023.01); *G06T 5/60* (2024.01); *G06T 5/70* (2024.01);
(Continued)

(58) Field of Classification Search
CPC . G06T 9/002; G06T 5/70; G06T 2207/20081; G06T 2207/20084; G06T 5/60; G06N 3/084; G06N 3/0985
See application file for complete search history.

(56) References Cited

U.S. PATENT DOCUMENTS

2014/0085501 A1 3/2014 Tran
2017/0083762 A1 3/2017 Segalovitz et al.
(Continued)

FOREIGN PATENT DOCUMENTS

WO 2020/025955 A1 2/2020
WO 2020/062074 A1 4/2020

OTHER PUBLICATIONS

Dougal Maclaurin et al., "Gradient-based Hyperparameter Optimization through Reversible Learning", 2015, Proceedings of the 32nd International Conference on Machine Learning, https://proceedings.mlr.press/v37/maclaurin15.html (Year: 2015).*
(Continued)

*Primary Examiner* — Dave Misir
(74) *Attorney, Agent, or Firm* — Sughrue Mion, PLLC

(57) ABSTRACT

A method, apparatus, and non-transitory computer-readable medium for adaptive neural image compression by meta-learning using substitute QF settings, which includes generating one or more substitute quality factors via a plurality of iterations using the original quality factors, wherein the substitute quality factors are a modified version of the original quality factors and are associated with a single instance of neural network loop filtering model. The approach may further include determining a neural network based loop filter comprising neural network based loop filter parameters and a plurality of layers, wherein the neural network based loop filter parameters include shared parameters and adaptive parameters, and may further include generating enhanced video data, based on the one or more
(Continued)

substitute quality factors and the input video data, using the neural network based loop filter.

18 Claims, 9 Drawing Sheets

(51) Int. Cl.

| | |
|---|---|
| ***G06N 3/0985*** | (2023.01) |
| ***G06T 5/60*** | (2024.01) |
| ***G06T 5/70*** | (2024.01) |
| ***G06T 9/00*** | (2006.01) |

(52) U.S. Cl.
CPC .... *G06T 9/002* (2013.01); *G06T 2207/20081* (2013.01); *G06T 2207/20084* (2013.01)

(56) References Cited

U.S. PATENT DOCUMENTS

| | | | | |
|---|---|---|---|---|
| 2021/0104076 | A1 | 4/2021 | Zare et al. | |
| 2021/0250620 | A1* | 8/2021 | Yin | G06N 3/045 |
| 2022/0295116 | A1* | 9/2022 | Ma | H04N 19/117 |

OTHER PUBLICATIONS

Yiren Zhou et al., "Adaptive Quantization for Deep Neural Network", Apr. 29, 2018, AAAI, https://ojs.aaai.org/index.php/AAAI/article/view/11623 (Year: 2018).*
Xiaoyu Xiu et al., "An adaptive quantization method for 360-degree video coding", Sep. 17, 2018, Proceedings vol. 10752, Applications of Digital Image Processing XLI; 107520X, https://doi.org/10.1117/12.2321963 (Year: 2018).*
Zhijie Huang et al., "An Efficient QP Variable Convolutional Neural Network Based In-loop Filter for Intra Coding", Dec. 30, 2020, arXiv:2012.15003v1 (Year: 2020).*
Jason Brownlee, "Use Early Stopping to Halt the Training of Neural Networks At the Right Time", Aug. 25, 2020, Machine Learning Mastery, https://machinelearningmastery.com/how-to-stop-training-deep-neural-networks-at-the-right-time-using-early-stopping/ (Year: 2020).*
Lijun Zhao et al., "Learning a Virtual Codec Based on Deep Convolutional Neural Network to Compress Image", Journal of Latex Class Files, 2018, pp. 1-11 (16 pages total).
Written Opinion dated Oct. 4, 2022 issued by the International Searching Authority in Application No. PCT/US2022/029122.
International Search Report dated Oct. 4, 2022 issued by the International Searching Authority in Application No. PCT/US2022/029122.
Extended European Seach Report issued Oct. 30, 2023 in European Application No. 22793368.6.
Zhijie Huang, et al., "An Efficient QP Variable Convolutional Neural Network Based In-loop Filter for Intra Coding", 2021 Data Compression Conference (DCC), IEEE, 2021, pp. 33-42 (10 pages).
Dake He, et al., "Video Coding Technology Proposal by RIM", Joint Collaborative Team on Video Coding (JCT-VC) of ITU-T SG16 WP3 and ISO/IEC JTC1/SC29/WG11, JCTVC-A120, Apr. 15-23, 2010, 1st Meeting, Dresden, DE (29 pages).
Fatemeh Nasiri, et al., "A CNN-based Prediction-Aware Quality Enhancement Framework for VVC", ARXIV.org, arXiv:2105.05658v1, May 12, 2021, pp. 1-19 (19 pages).

* cited by examiner

300A

700

SUBSTITUTIONAL QUALITY FACTOR LEARNING FOR QUALITY-ADAPTIVE NEURAL NETWORK-BASED LOOP FILTER

CROSS-REFERENCE TO RELATED APPLICATION(S)

This application is based on and claims priority to U.S. Provisional Patent Application No. 63/190,109, filed on May 18, 2021, the disclosure of which is incorporated by reference herein in its entirety.

BACKGROUND

Video coding standards such as H.264/Advanced Video Coding (H.264/AVC), High-Efficiency Video Coding (HEVC) and Versatile Video Coding (VVC) share a similar (recursive) block-based hybrid prediction and/or transform framework. In such standards, to optimize the overall efficiency, individual coding tools like the intra/inter prediction, integer transforms, and context-adaptive entropy coding, are intensively handcrafted. These individual coding tools leverage spatiotemporal pixel neighborhoods for predictive signal construction, to obtain corresponding residuals for subsequent transform, quantization, and entropy coding. Neural networks on the other hand extract different levels of spatiotemporal stimuli by analyzing spatiotemporal information from the receptive field of neighboring pixels, essentially exploring highly nonlinear and nonlocal spatiotemporal correlations. There is a need to explore improved compression quality using highly nonlinear and nonlocal spatiotemporal correlations.

Methods of lossy video compression often suffer from the compressed video having artefacts which severely degrade the Quality of Experience (QoE). The amount of distortion tolerated often depends on the application, but in general, the higher the compression ratio, the larger the distortion. Compression quality may be influenced by many factors. For example, the quantization parameter (QP) determines the quantization step size, and the larger the QP value, the larger the quantization step size, and the larger the distortion. To accommodate different requests of users, the video coding methods need the ability to compress videos with different compression qualities.

Although previous approaches involving deep neural networks (DNNs) have shown promising performance by enhancing video quality of the compressed video, it is a challenge for neural network-based (NN) quality enhancement methods to accommodate different QP settings. As an example, in previous approaches, each QP value is treated as an individual task and one NN model instance is trained and deployed for each QP value. In practice, different input channels have different QP values, e.g., chroma and luma components having different QP values. In such a situation, previous approaches require a combinatorial number of NN model instances. When more and different types off quality settings are added, the number of combinatorial NN models becomes prohibitively large. Moreover, a model instance trained for a specific setting of quality factors (QF) generally does not work well for other settings. While an entire video sequence usually has the same settings for some QF parameters, to achieve best enhancement effects, different frames may require different QF parameters. Therefore, methods, systems, and apparatuses that provide flexible quality control with arbitrary smooth settings of the QF parameters are required.

SUMMARY

According to embodiments of the present disclosure, a method for video enhancement based on neural network based loop filtering using meta learning may be provided. The method may be executed by at least one processor and include receiving input video data and one or more original quality control factors; generating one or more substitute quality factors via a plurality of iterations using the one or more original quality factors, wherein the one or more substitute quality factors are a modified version of the one or more original quality factors and are associated with a single instance of neural network loop filtering model; determining a neural network based loop filter comprising neural network based loop filter parameters and a plurality of layers, wherein the neural network based loop filter parameters include shared parameters and adaptive parameters; and generating enhanced video data, based on the one or more substitute quality factors and the input video data, using the neural network based loop filter.

According to embodiments of the present disclosure, an apparatus including at least one memory configured to store program code; and at least one processor configured to read the program code and operate as instructed by the program code may be provided. The program code may include receiving code configured to cause the at least one processor to receive input video data and one or more original quality control factors; first generating code configured to cause the at least one processor to generate one or more substitute quality factors via a plurality of iterations using the one or more original quality factors, wherein the one or more substitute quality factors are a modified version of the one or more original quality factors and are associated with a single instance of neural network loop filtering model; first determining code configured to cause the at least one processor to determine a neural network based loop filter comprising neural network based loop filter parameters and a plurality of layers, wherein the neural network based loop filter parameters include shared parameters and adaptive parameters; and second generating code configured to cause the at least one processor to generate enhanced video data, based on the one or more substitute quality factors and the input video data, using the neural network based loop filter.

According to embodiments of the present disclosure, a non-transitory computer readable medium storing a storing instructions may be provided. The instructions, when executed by one or more processors of a device may include instructions to receive input video data and one or more original quality control factors; generate one or more substitute quality factors via a plurality of iterations using the one or more original quality factors, wherein the one or more substitute quality factors are a modified version of the one or more original quality factors and are associated with a single instance of neural network loop filtering model; determine a neural network based loop filter comprising neural network based loop filter parameters and a plurality of layers, wherein the neural network based loop filter parameters include shared parameters and adaptive parameters; and generate enhanced video data, based on the one or more substitute quality factors and the input video data, using the neural network based loop filter.

DETAILED DESCRIPTION

Embodiments of the present disclosure are directed to methods, systems, and apparatuses for a quality-adaptive neural network-based loop filtering (QANNLF) for processing a video to reduce one or more types on artefacts such as noises, blur, block effects, etc. In embodiments, a Meta neural network-based loop filtering (Meta-NNLF) method and/or process may adaptively compute quality-adaptive weight parameters of the underlying neural network-based loop filtering (NNLF) model based on the current decoded video and the QF of the decoded video, such as the Coding Tree Unit (CTU) partition, the QP, the deblocking filter boundary strength, the CU intra prediction mode, etc. According to embodiments of the present disclosure only one Meta-NNLF model instance may achieve effective artifact reduction over decoded videos with arbitrary smooth QF settings, including the seen settings in the training process and the unseen settings in actual application. According to embodiments of the present application, the one or more substitutional quality control parameters may be learned on the encoder side, adaptively for each input image, to improve the computed quality-adaptive weight parameters towards better recovery of the target image. The learned one or more substitutional quality control parameters may be sent to the decoder side to reconstruct the target video.

Figure 1:
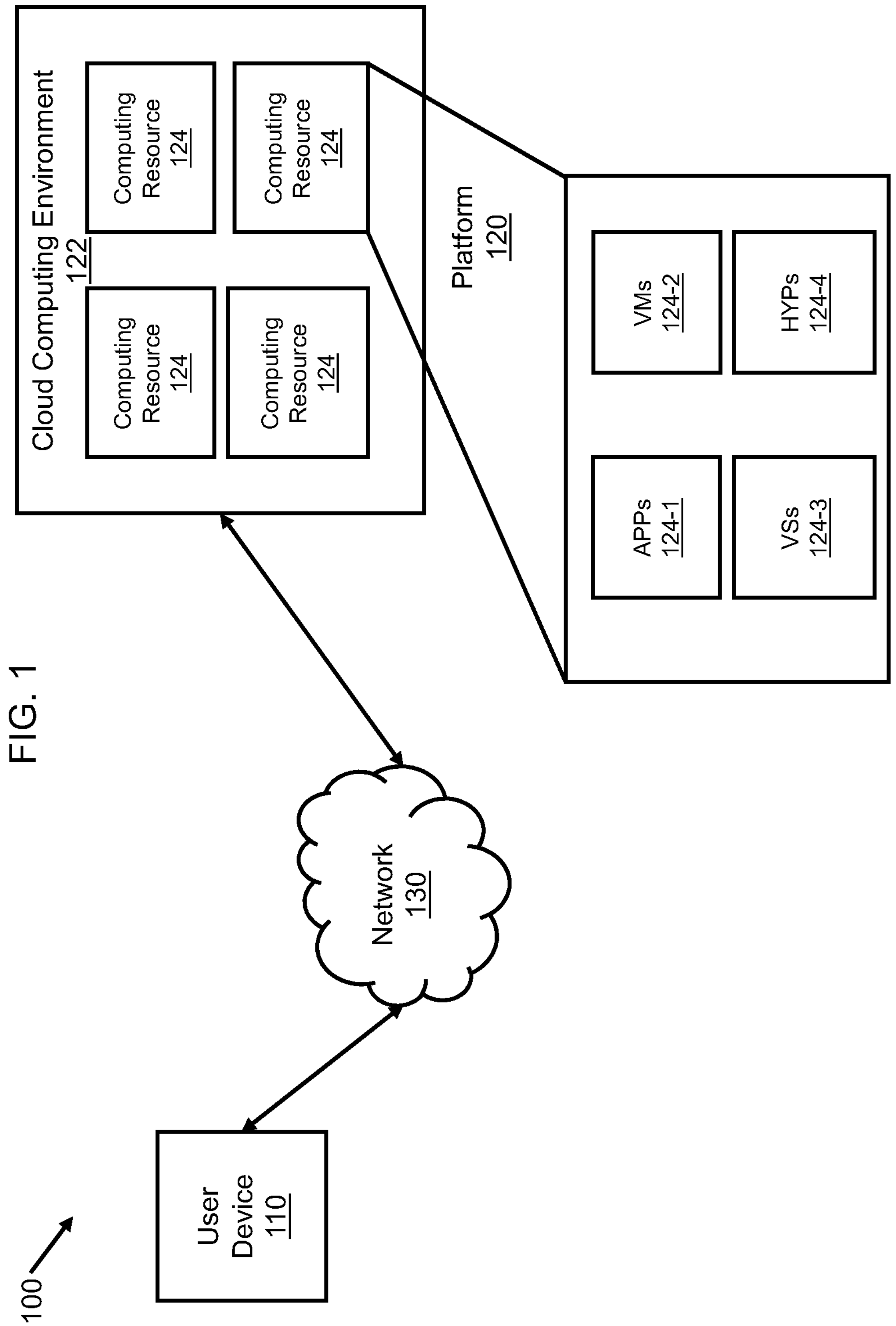
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
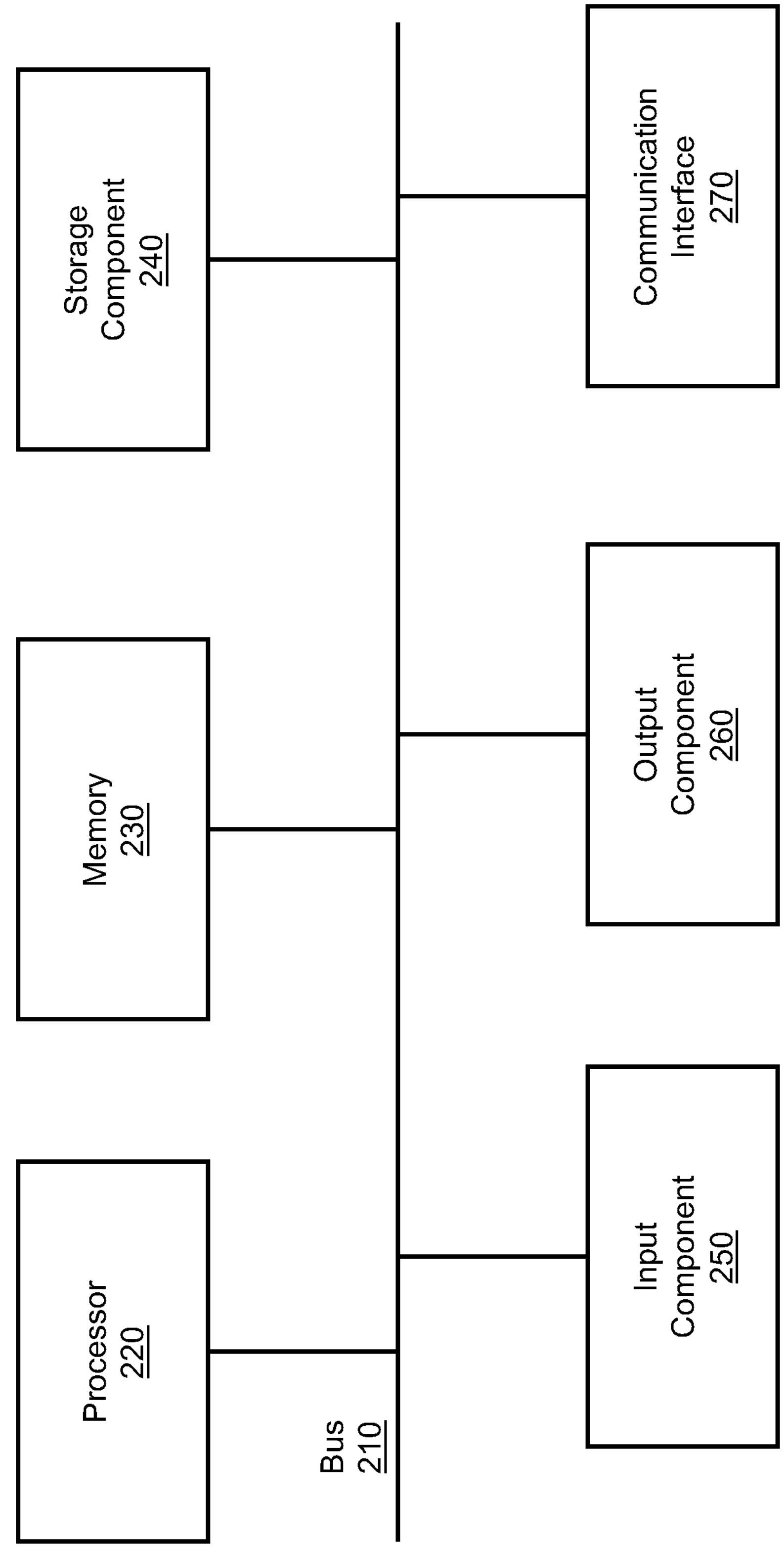
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Methods and apparatuses for video enhancement based on neural network based loop filtering using Meta learning will now be described in detail.

This disclosure proposes a method for QANNLF, by finding one or more substitutional quality control parameters in a Meta-NNLF framework. According to embodiments, Meta-learning mechanism may be used to adaptively compute the quality-adaptive weight parameters of the underlying NNLF model based on the current decoded video and the QF parameters, enabling a single Meta-NNLF model instance to enhance decoded videos with substitutional quality control parameters.

Embodiments of the present disclosure relate to enhancing decoded videos to achieve effective artifact reduction over decoded videos with arbitrary smooth QF settings, including the seen settings in the training process and the unseen settings in actual application.

Generally, a video compression framework may be described as follows. Given an input video comprising of plurality of image inputs $x_1, \ldots x_T$ where each input image $x_t$ may be of size (h,w,c), may be an entire frame or a micro-block in an image frame such as a CTU where h, w, c are a height, a width, and a number of channels, respectively. Each image frame may be a color image (c=3), a gray-scale image (c=1), an rgb+depth image (c=4), etc. To encode video data, in a first motion estimation step, the input image(s) may be further partitioned into spatial blocks, each blocks partitioned into smaller blocks iteratively, and a set of motion vectors $m_t$ between a current input $x_i$ and a set of previous reconstructed inputs $\{\hat{x}_j\}_{t-1}$ is computed for each block. The subscript t denotes the current t-th encoding cycle, which may not match the time stamp of the image input. Additionally, $\{\hat{x}_j\}_{t-1}$ may contain reconstructed inputs from multiple previous encoding cycles, such that the time difference between inputs in $\{\hat{x}_j\}_{t-1}$ may vary arbitrarily. Then, in a second motion compensation step, a predicted input $\tilde{x}_t$ may be obtained by copying the corresponding pixels of the previous $\{\hat{x}_j\}_{t-1}$ based on motion vectors $m_t$. Then, a residual $r_t$ between the original input $x_t$ and the predicted input $\tilde{x}_t$ may be obtained. Then a quantization step may be performed where the residual $r_t$ may be quantized. According to embodiments, transformations such as DCT where the DCT coefficients of $r_t$ are quantized are performed prior quantizing the residual $r_t$. A result of the quantization may be a quantized $\hat{y}_t$. Then both the motion vectors $m_t$ and quantized $\hat{y}_t$ are encoded into bitstreams using entropy coding and sent to decoders. On the decoder side, the quantized $\hat{y}_t$ may be dequantized to obtain the residual $r_t$ which is then added back to the predicted input $\tilde{x}_t$ to obtain reconstructed input $\hat{x}_t$. Without limitations, any method or process may be used for dequantization, such as inverse transformations like IDCT with the dequantized coefficients. Additionally, without limitation, any video compression method or coding standard may be used.

In previous approaches, one or multiple enhancement modules may be selected to process reconstructed $\hat{x}_t$, including Deblocking Filter (DF), Sample-Adaptive Offset (SAO), Adaptive Loop Filter (ALF), Cross-Component Adaptive Loop Filter (CCALF), etc, to enhance the visual quality of the reconstructed input $\hat{x}_t$.

Embodiments of the present disclosure are directed to further improving the visual quality of the reconstructed input $\hat{x}_t$. According to embodiments of the present disclosure, a QANNLF mechanism may be provided for enhancing the visual quality of the reconstructed input $\hat{x}_t$ of a video coding system. The target is to reduce artifacts such as noises, blur, blocky effects in $\hat{x}_t$ resulting in a high-quality $$\hat{x}_t^h.$$

More specifically, a Meta-NNLF method may be used to compute $$\hat{x}_t^h$$

with only one model instance that may accommodate multiple and arbitrary smooth QF settings.

Figure 3A:
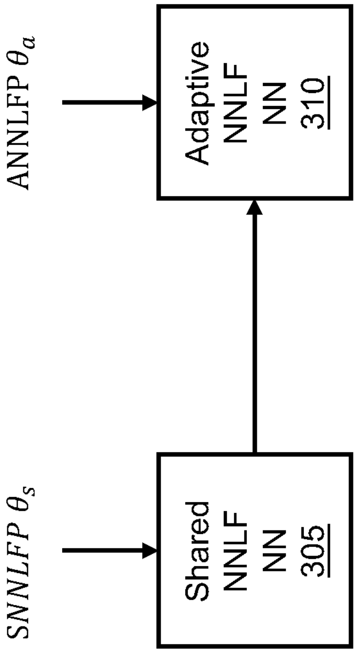
FIGS. 3A and 3B are block diagrams of Meta neural network loop filter (Meta-NNLF) architectures for video enhancement using Meta learning, according to embodiments.
Figure 3B:
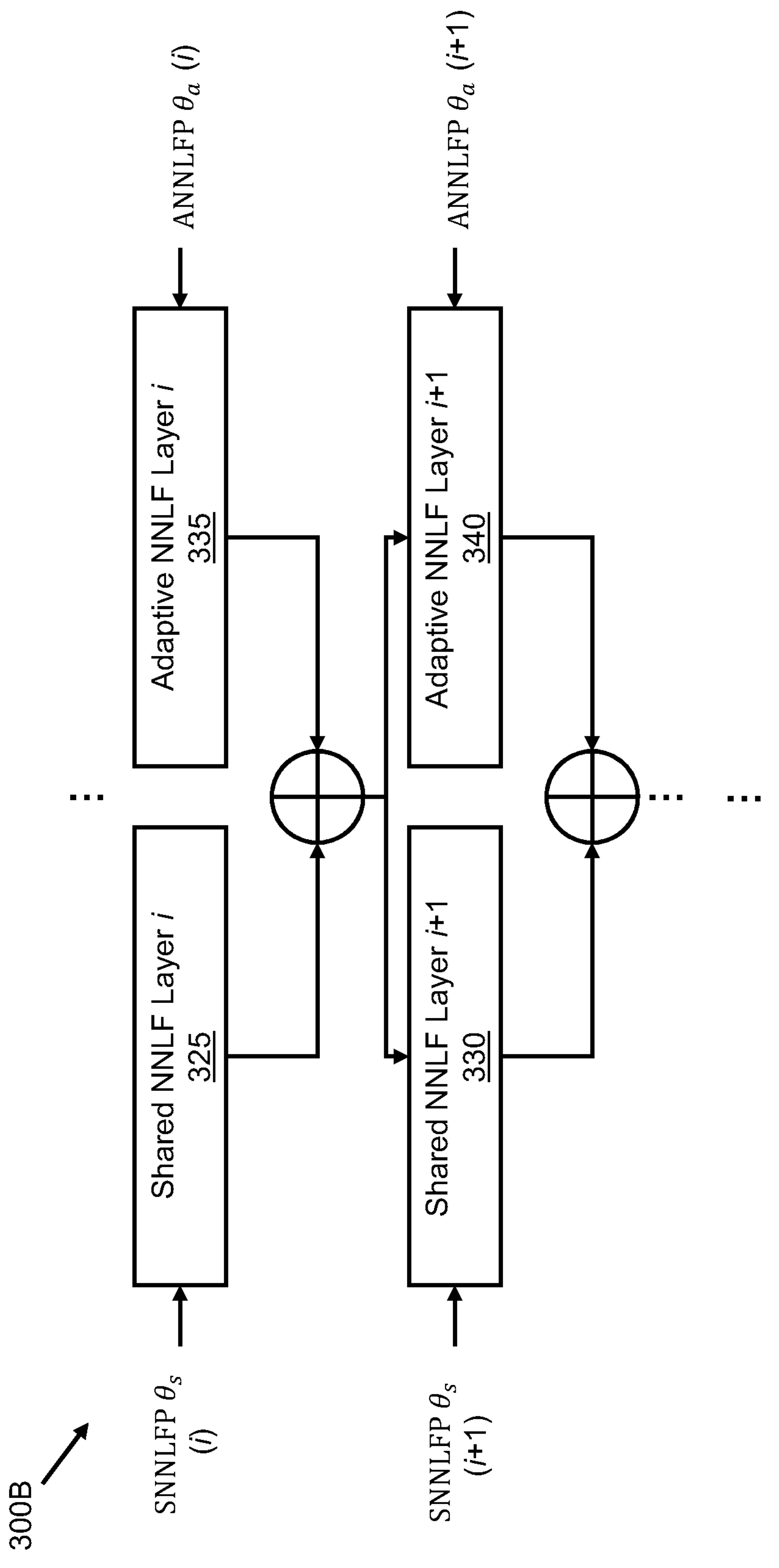

FIGS. 3A and 3B are block diagrams of Meta-NNLF architectures 300A and 300B for video enhancement using Meta learning, according to embodiments.

As shown in FIG. 3A, the Meta-NNLF architecture 300A may include a shared NNLF NN 305, an adaptive NNLF NN 310.

As shown in FIG. 3B, the Meta-NNLF architecture 300B may include shared NNLF layers 325 and 330, and adaptive NNLF layers 335 and 340.

In the present disclosure, model parameters of an underlying NNLF model may be separated into 2 parts $\theta_s$, $\theta_a$ denoting Shared NNLF Parameters (SNNLFP) and the Adaptive NNLF Parameters (ANNLFP), respectively. FIGS. 3A and 3B show two embodiments of an NNLF network architecture.

In FIG. 3A, Shared NNLF NN with SNNLFP $\theta_s$ and the Adaptive NNLF NN with ANNLFP $\theta_a$ may be separated individual NN modules, and these individual modules may be connected to each other sequentially for network forward computation. Here, FIG. 3A shows a sequential order of connecting these individual NN modules. Other orders may be used here.

In FIG. 3B, a parameter may be split within NN layers. Let $\theta_s(i)$, $\theta_a(i)$ denote the SNNLFP and ANNLFP for the i-th layer of the NNLF model, respectively. The network may compute the inference outputs based on the corresponding inputs for the SNNLFP and ANNLFP respectively, and these outputs may be combined (e.g., by addition, concatenation, multiplication, etc.) and then send to the next layer.

The embodiment of FIG. 3A may be seen as a case of FIG. 3B, in which layers in the Shared NNLF NN 325 $\theta_s(i)$ may be empty, layers in the adaptive NNLF NN 340 $\theta_a(i)$ may be empty. Therefore, in other embodiments, the network structures of FIGS. 3A and 3B may be combined.

Figure 4:
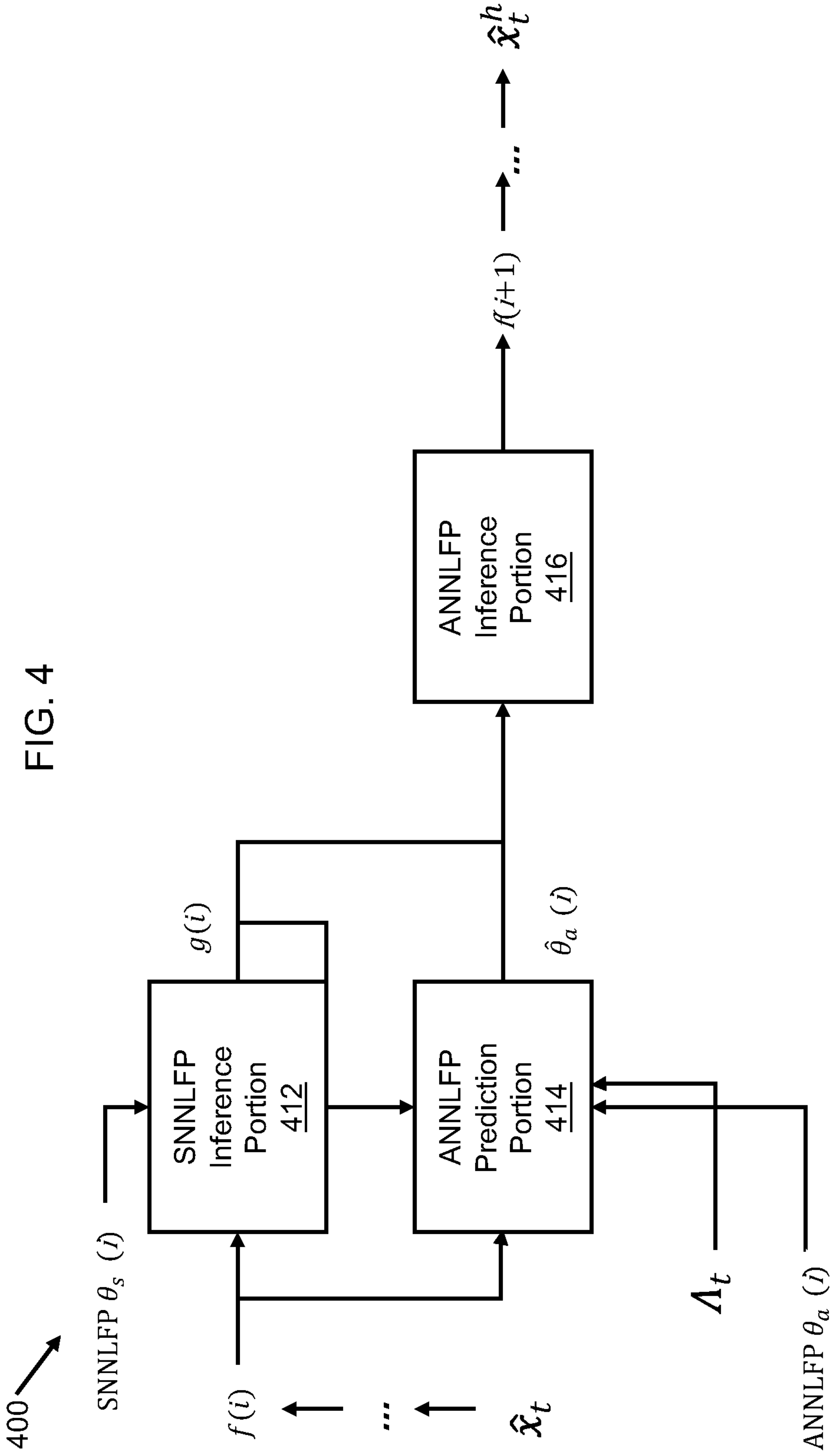
FIG. 4 is a block diagram of an apparatus for Meta-NNLF model for video enhancement using Meta learning, according to embodiments.

FIG. 4 is a block diagram of an apparatus 400 for Meta-NNLF for video enhancement using Meta learning, during a test stage, according to embodiments.

FIG. 4A shows an overall workflow of the test stage or inference stage of the Meta-NNLF.

Let reconstructed input $\hat{x}_t$ of size (h,w,c,d) denote the input of the Meta-NNLF system, where h, w, c, d are the height, width, number of channels, and number of frames, respectively. Thus, a number of d−1 (d−1≥0) adjacent frames of $\hat{x}_t$ may be used together with $\hat{x}_t$ as input $\hat{x}_t$ to help generate the enhanced $$\hat{x}_t^h.$$

These multiple adjacent frames usually include a set of previous frames $\{\hat{x}_l'\}$, l<t, where each $\hat{x}_l'$ may be decoded frame $\hat{x}_l$ or the enhanced frame $$\hat{x}_l^h$$

at a time l. Let $\Lambda_t$ denote QF setting, each $\lambda_l$ associated with each $$\hat{x}_l'$$

to provide the corresponding QF information, and $\lambda_t$ may be the QF setting for the current decoded frame $\hat{x}_t$. The QF settings may include various types of quality control factors, such as the QP value, the CU intra prediction mode, the CTU partition, the deblocking filter boundary strength, the CU motion vector, and so on.

Let $\theta_s(i)$ and $\theta_a(i)$ denote the SNNLFP and ANNLFP for the i-th layer of the Meta-NNLF model 400, respectively. This is a general notation, since for a layer that may be completely shared, $\theta_a(i)$ is empty. For a layer that may be completely adaptive, $\theta_s(i)$ may be empty. In other words, this notation may be used for both embodiments of FIGS. 3A and 3B.

An example embodiment of an inference workflow of the Meta-NNLF model 400 for an i-th layer is provided.

Given the reconstructed input $\hat{x}_t$, and given the QF settings $\Lambda_t$, the Meta-NNLF method may compute the enhanced $$\hat{x}_t^h.$$

Let f(i) and f(i+1) denote the input and output tensor of the i-th layer of the Meta-NNLF model 400. Based on a current input f(i) and $\theta_s(i)$, the SNNLFP Inference portion 412 may compute a shared feature g(i) based on a shared inference function $G_i(f(i), \theta_s(i)))$ that may be modeled by a forward computation using the SEP in the i-th layer. Based on f(i), g(i), $\theta_a(i)$ and $\Lambda_t$, an ANNLFP Prediction portion 414 may compute an estimated ANNLFP $\hat{\theta}_a(i)$ for the i-th layer. The ANNLFP prediction portion 414 may be an NN, e.g., including convolution and fully connected layers, which may predict the updated $\hat{\theta}_a(i)$ based on the original ANNLFP $\theta_a(i)$, the current input, and the QF settings $\Lambda_t$. In some embodiments, the current input f(i) may be used as an input to the ANNLFP prediction portion 414. In some other embodiments, the shared feature g(i) may be used instead of the current input f(i). In other embodiments, an SNNLFP loss may be computed based on the shared feature g(i), and a gradient of the loss may be used as input to the ANNLFP prediction portion 414. Based on the estimated ANNLFP $\hat{\theta}_a(i)$ and the shared feature g(i), the ANNLFP inference portion 416 may compute an output tensor f(i+1) based on an ANNLFP inference function $A_i(g(i),\hat{\theta}_a(i))$ that may be modeled by the forward computation using the estimated AEP in the i-th layer.

Note that the workflow described in FIG. 4 is an example notation. For a layer that may be completely shared with the $\theta_a(i)$ being empty, ANNLFP-related modules and f(i+1)=g(i) may be omitted. For a layer that may be completely adaptive with the $\theta_s(i)$ being empty, SNNLFP-related modules and g(i)=f(i) may be omitted.

Assume there are a total of N layers for the Meta-NNLF model 400, an output of a last layer may be the enhanced $$\hat{x}_t^h.$$

Note that the Meta-NNLF framework allows an arbitrary smooth QF settings for flexible quality control. In other words, the processing workflow described above will be able to enhance the quality of decoded frame with arbitrary smooth QF settings that may or may not be included in the training stage.

In embodiments when the ANNLFP prediction portion 414 only performs prediction over a pre-defined set of QF settings with/without considering the input f(i), a Meta-NNLF model may reduce to a multi-QF NNLF model which uses one NNLF model instance to accommodate the enhancement of multiple pre-defined QF settings. Other reduced special cases may certainly be covered here.

Figure 5:
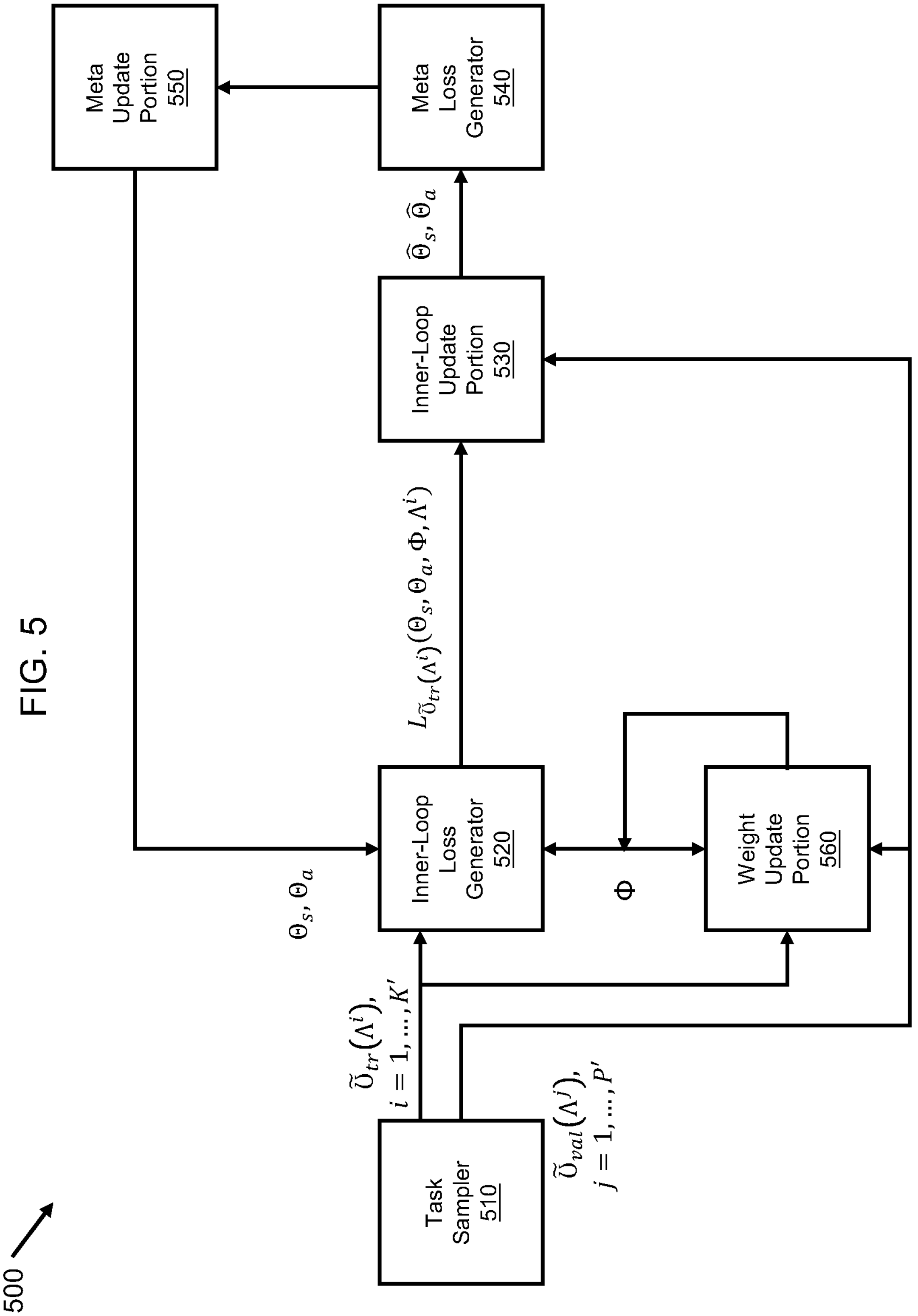
FIG. 5 is a block diagram of a training apparatus for Meta-NNLF for video enhancement using Meta learning, according to embodiments.

FIG. 5 is a block diagram of a training apparatus 500 for Meta-NNLF for video enhancement using Meta learning, during a training stage, according to embodiments.

As shown in FIG. 5, the training apparatus 500 may include a task sampler 510, an inner-loop loss generator 520, an inner-loop update portion 530, a Meta loss generator 540, a Meta update portion 550 and a weight update portion 560.

A training process aims at learning the SNNLFP $\theta_s(i)$ and ANNLFP $\theta_a(i)$, i=1, . . . , N for the Meta-NNLF model 400, as well as the ANNLFP Prediction NN (model parameters denoted as Φ).

In embodiments, a Model-Agnostic Meta-Learning (MAML) mechanism may be used for a training purpose. FIG. 5 gives an example workflow of a Meta-training framework. Other Meta-training algorithms may be used here.

For training, there may be a set of training data $\mho_{tr}(\Lambda^i)$, i=1, . . . , K, where each $\mho_{tr}(\Lambda^i)$ corresponds to a training QF setting, and there are K training QF settings (thus K training data sets) in total. For training, there may be $q_{qp}$ different training QP values, $q_{CTU}$ different training CTU partitions, etc., and there may be a finite number of $K=q_{qp}\times q_{CTU}\times \ldots$ different training QF settings. Therefore, each training data set $\mho_{tr}(\Lambda^i)$ may be associated with each of these QF settings. In addition, there may be a set of validation data $\mho_{val}(\Lambda^j)$, j=1, . . . , P, where each $\mho_{val}(\Lambda^j)$ corresponds to a validation QF settings, and there are P validation QF settings in total. The validation QF settings may include different values from the training set. The validation QF settings may also have same values as those from the training set.

An overall training goal may be to learn a Meta-NNLF model so that it may be broadly applied to all (including training and future unseen) values of QF settings. The assumption being that an NNLF task with a QF setting may be drawn from a task distribution P(Λ). To achieve the training goal mentioned above, a loss for learning the Meta-NNLF model may be minimized across all training data sets across all training QF settings.

The MAML training process may have an outer loop and an inner loop for gradient-based parameter updates. For each outer loop iteration, the task sampler 510 first samples a set of K' training QF settings (K'≤K). Then for each sampled training QF setting $\Lambda^i$, the task sampler 510 samples a set of training data $\mho_{tr}(\Lambda^i)$ from the set of training data $\mho_{tr}$ $(\Lambda^i)$. Also, the task sampler 510 samples a set of P' (P'≤P) validation QF settings, and for each sampled validation QF setting $\Lambda^j$, samples a set of validation data $\mho_{val}(\Lambda^j)$ from the set of validation data $\mho_{val}(\Lambda^j)$. Then for each sampled datum $\hat{x}_t \in \mho_{tr}(\Lambda^i)$, a Meta-NNLF forward computation may be conducted based on current parameters $\Theta_s$, $\Theta_a$, and $\Phi$ and the inner-loop loss generator 520 then may compute an accumulated inner-loop loss $L_{\mho_{tr}(\Lambda^i)}(\Theta_s, \Theta_a, \Phi, \Lambda^i)$:

$$L_{\mho_{tr}(\Lambda^i)}(\theta_s, \theta_a, \Phi, \Lambda^i) = \Sigma_{\hat{x}_t \in \mho_{tr}(\Lambda^i)} L(\hat{x}_t, \theta_s, \theta_a, \Phi, \Lambda^i). \quad (1)$$

The loss function $L(\hat{x}_t,\theta_s,\theta_a,\Phi,\Lambda^i)$ may include a distortion loss between a ground-truth image $$x_t^{gt}$$

and the enhanced output $$\hat{x}_t^h : D(x_t^{gt}, \hat{x}_t^h)$$

and some other regularization loss (e.g., auxiliary loss of distinguishing the intermediate network output targeting at different QF factors). Any distortion metric may be used, e.g., MSE, MAE, SSIM, etc., may be used as $$D(x_t^{gt}, \hat{x}_t^h).$$

Then, based on the inner-loop loss $$L_{\mho_{tr}(\Lambda^i)}(\theta_s, \theta_a, \Phi, \Lambda^i),$$

given step sizes $\alpha_{si}$ and $\alpha_{ai}$ as quality control parameters/hyperparameters for $\Lambda^i$, the inner-loop update portion 530 may compute an updated task-specific parameter update:

$$\hat{\theta}_a = \theta_a - \Sigma_{i=1}^{K'} \alpha_{ai} \nabla_{\theta_a} L_{\mho_{tr}(\Lambda^i)}(\theta_s, \theta_a, \Phi, \Lambda^i), \quad (2);$$

$$\hat{\theta}_s = \theta_s - \Sigma_{i=1}^{K'} \alpha_{si} \nabla_{\theta_s} L_{\mho_{tr}(\Lambda^i)}(\theta_s, \theta_a, \Phi, \Lambda^i). \quad (3)$$

Gradient $$\nabla_{\theta_a} L_{\mho_{tr}(\Lambda^i)}(\theta_s, \theta_a, \Phi, \Lambda^i)$$

and gradient $$\nabla_{\theta_s} L_{\mho_{tr}(\Lambda^i)}(\theta_s, \theta_a, \Phi, \Lambda^i)$$

of the accumulated inner-loop loss $$L_{\mho_{tr}(\Lambda^i)}(\theta_s, \theta_a, \Phi, \Lambda^i)$$

may be used to compute an updated version of adaptive parameters $\hat{\Theta}_a$ and $\hat{\Theta}_s$, respectively.

Then, a meta loss generator 540 may compute an outer meta objective or loss over all sampled validation quality control parameters:

$$L(\theta_s, \theta_a, \Phi) = \sum_{j=1}^{P'} L_{\mho_{val}(\Lambda^j)}(\hat{\theta}_s, \hat{\theta}_a, \Phi, \Lambda^j), \quad (4);$$

$$L_{\mho_{val}(\Lambda^j)}(\hat{\theta}_s, \hat{\theta}_a, \Phi, \Lambda^j) = \sum_{\hat{x}_t \in \mho_{tr}(\Lambda^j)} L(\hat{x}_t, \hat{\theta}_s, \hat{\theta}_a, \Phi, \Lambda^j), \quad (5)$$

where $L(\hat{x}_t,\hat{\theta}_s,\hat{\theta}_a,\Phi,\Lambda^j)$ may be the loss computed for decoded frame $\hat{x}_t$ based on the Meta-NNLF forward computation using parameters $\hat{\theta}_s$, $\hat{\theta}_a$, $\Phi$, with QF setting $\Lambda^j$. Given step size $\beta_{aj}$ and $\beta_{sj}$ as hyperparameters for $\Lambda^j$, the meta update portion 550 updates the model parameters as:

$$\theta_a = \theta_a - \sum_{j=1}^{P'} \beta_{aj} \nabla_{\theta_a} L_{\mho_{val}(\Lambda^j)}(\hat{\theta}_s, \hat{\theta}_a, \Phi, \Lambda^j); \quad (6)$$

$$\theta_s = \theta_s - \sum_{j=1}^{P'} \beta_{sj} \nabla_{\theta_s} L_{\mho_{val}(\Lambda^j)}(\hat{\theta}_s, \hat{\theta}_a, \Phi, \Lambda^j) \quad (7)$$

In some embodiments, $\Theta_s$ may not be updated in the inner loop, i.e., $\alpha_{si}=0$, $\hat{\Theta}_s=\Theta_s$. The non-updation helps to stabilize the training process.

As for parameters $\Phi$ of the ANNLFP Prediction NN, the weight update portion 560 updates them in a regular training manner. That is, according to the training and validation data $\tilde{\mho}_{tr}(\Lambda^i)$, i=1, . . . , K$\tilde{\mho}$, $\tilde{\mho}_{val}(\Lambda^j)$, j=1, . . . , P', based on the current $\theta_s$, $\theta_a$, $\Phi$, we may compute loss $L(\hat{x}_t,\hat{\theta}_s,\hat{\theta}_a,\Phi,\Lambda^i)$ of all samples $\hat{x}_t \in \tilde{\mho}_{tr}(\Lambda^i)$ and $L(\hat{x}_t,\hat{\theta}_s,\hat{\theta}_a,\Phi,\Lambda^j)$ for all samples $\hat{x}_t \in \tilde{\mho}_{val}(\Lambda^j)$. And gradients of all these losses may be accumulated (e.g. added up) to perform parameter updates over $\Phi$ through regular back-propagation.

Embodiments of the present disclosure are not restricted to the above-mentioned optimization algorithm or loss functions for updating these model parameters. Any optimization algorithm or loss functions for updating these model parameters known in the art may be used.

When the ANNLFP prediction portion 414 of the Meta-NNLF model only performs prediction over the pre-defined set of training QF settings, the validation QF settings may be the same with the training ones. The same MAML training procedure may be used to train the above-mentioned reduced Meta-NNLF model (i.e., a multi-QF-setting NNLF model that uses one model instance to accommodate compression effects of multiple pre-defined bitrates).

Embodiments of the present disclosure allows for using only one QANNLF model instance to accommodate multiple QF settings by using Meta-learning. Additionally, embodiments of the present disclosure enable using only one instance of a Meta-NNLF model to accommodate different types of inputs (e.g., frame level or block level, single image or multi-image, single channel or multi-channel) and different types of QF parameters (e.g., an arbitrary combination of QP values for different input channels, CTU partitions, the deblocking filter boundary strength, etc.)

Figure 6:
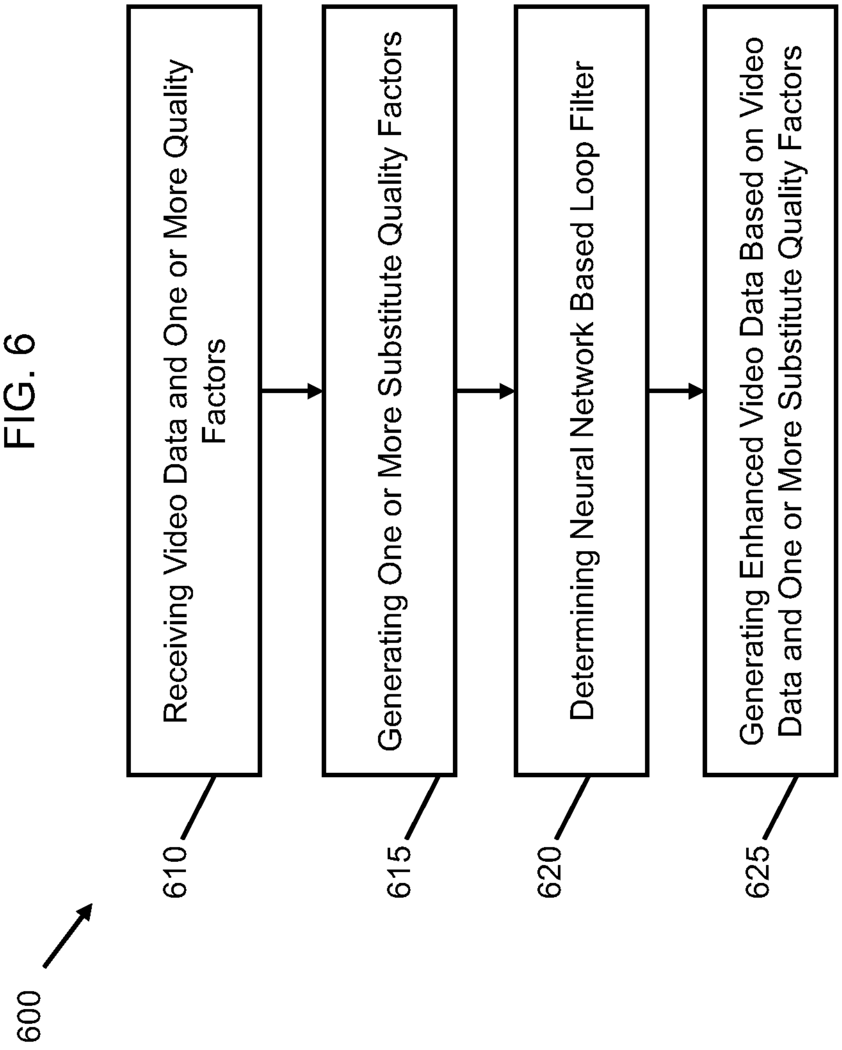
FIG. 6 is an exemplary flowchart illustrating a process for video enhancement using Meta-NNLF, according to embodiments.

FIG. 6 is a flowchart of a method 600 for video enhancement based on neural network based loop filtering using Meta learning, according to embodiments.

As shown in FIG. 6A, at operation 610, the method 600A may include receiving video data receiving one or more quality factors associated with the reconstructed video data.

In some embodiments, the video data (also referred to as reconstructed video data in some embodiments) may include a plurality of reconstructed input frames, and the methods described herein may be applied on a current frame of the plurality of reconstructed input frames. In some embodiments, the reconstructed input frames may be further broken down and used as the input to the Meta-NNLF model.

In some embodiments, the one or more quality factors associated with the reconstructed video data may include at least one of a coding tree unit partition, a quantization parameter, a deblocking filter boundary strength, a coding unit motion vector, and a coding unit prediction mode.

In some embodiments, the reconstructed video data may be generated from a bitstream comprising decoded quantized video data and motion vector data. As an example, generating the reconstructed video data may include receiving a stream of video data including quantized video data and motion vector data. Then, generating the reconstructed video data may include dequantizing the stream of quantized data, using an inverse transformation, to obtain a recovered residual; and generating the reconstructed video data based on the recovered residual and the motion vector data.

At operation 615, one or more substitute quality factors may be generated via a plurality of iterations using one or more original quality factors, wherein the one or more substitute quality factors are a modified version of the one or more original quality factors.

According to embodiments of the present disclosure, in a first iteration of the plurality of iterations, the one or more substitute quality factors may be initialized to as the one or more original quality control factors prior to a computing of the target loss. For each of the subsequent iterations, a target loss may be computed based on the enhanced video data and the input video data. A gradient of the target loss may also be computed and back propagated through the model/system. Based on the gradient of the target loss, the one or more substitute quality factors may be updated. In a final iteration or last iteration, the one or more substitute quality factors may be updated to one or more final substitute quality control factors.

According to embodiments of the present disclosure, the number of iterations in the plurality of iterations may be based on a pre-determined maximum number of iterations. According to some embodiments of the present disclosure, the number of iterations in the plurality of iterations may be adaptively based on the received video data and the neural network based loop filter. According to some embodiments of the present disclosure, the number of iterations in the plurality of iterations is based on the updating the one or more substitute quality factors being less than a pre-determined threshold.

At operation 620, a neural network based loop filter comprising neural network based loop filter parameters and a plurality of layers may be determined. In embodiments, the neural network based loop filter parameters may include shared parameters and adaptive parameters.

At operation 625, generating enhanced video data may be generated based on the one or more substitute quality factors and the input video data, using the neural network based loop filter. According to some embodiments, generating enhanced video data may include generating shared features based on an output from a previous layer, using a first shared neural network loop filter having first shared parameters. Then estimated adaptive parameters may be computed based on the output from the previous layer, the shared features, first adaptive parameters from a first adaptive neural network loop filter, and the one or more substitute quality factors, using a prediction neural network. The output for a current layer may be generated based on the shared features and the estimated adaptive parameters. The output of the last layer of the neural network based loop filter may be the enhanced video data.

According to some embodiments, the neural network based loop filter may be trained as follows. An inner-loop loss for training data corresponding to the one or more quality factors may be generated based on the one or more quality factors, the first shared parameters, and the first adaptive parameters. Then, the first shared parameters, and the first adaptive parameters may be updated based on gradients of the generated inner-loop loss. A meta loss for validation data corresponding to the one or more quality factors may be generated based on the one or more quality factors, the first updated first shared parameters, and the first updated first adaptive parameters. The first updated first shared parameters and the first updated first adaptive parameters may be updated again based on gradients of the generated meta loss.

According to some embodiments, training the prediction neural network may include generating a first loss for training data corresponding to the one or more quality factors, and generating a second loss for validation data corresponding to the one or more quality factors, based on the one or more quality factors, the first shared parameters, the first adaptive parameters, and prediction parameters of the prediction neural network, and then updating the prediction parameters, based on gradients of the generated first loss and the generated second loss.

According to embodiments of the present disclosure, the one or more quality factors associated with the video data may include at least one of a coding tree unit partition, a quantization parameter, a deblocking filter boundary strength, a coding unit motion vector, and a coding unit prediction mode. In some embodiments, post-enhancement or pre-enhancement processing may be performed and may include applying at least one of a deblocking filter, an adaptive loop filter, a sample adaptive offset, and a cross-component adaptive loop filter to the enhanced video data.

Methods and apparatuses for video enhancement using substitute QF settings based on neural network based loop filtering using Meta learning will now be described in detail.

According to an embodiment of the present disclosure, given the input or reconstructed input $\hat{x}_t$, and given a substitute QF settings $$\Lambda_t',$$

the proposed substitutional Meta-NNLF method may compute the enhanced $$\hat{x}_t^h$$

using the processing workflow described in herein based on the SNNLFP $\theta_s(i)$ and ANNLFP $\theta_a(i)$, i=1, . . . , N for the Meta-NNLF model, as well as the ANNLFP Prediction NN (with model parameters $\Phi$), by using the substitute QF settings $\Lambda'_t$ instead of the QF settings $\Lambda_t$.

The substitute QF settings $$\Lambda'_t$$

may be obtained through an iterative online learning according to an exemplary embodiment. The substitute QF settings $$\Lambda'_t$$

may be initialized as the original QF settings $\Lambda_t$. In each online learning iteration, based on the computed enhanced $$\hat{x}_t^h$$

and the original input $\hat{x}_t$, a target loss $$L(\hat{x}_t, \hat{x}_t^h \mid \Lambda'_t)$$

may be computed. The target loss may comprise a distortion loss $$D(\hat{x}_t, \hat{x}_t^h \mid \Lambda'_t)$$

and some other regularization loss (e.g., auxiliary loss to ensure natural visual qualities of the enhanced $$\hat{x}_t^h).$$

Any distortion measurement metrics, e.g., MSE, MAE, SSIM, etc., may be used as $$D(\hat{x}_t, \hat{x}_t^h \mid \Lambda'_t).$$

The gradient of the target loss $$L(\hat{x}_t, \hat{x}_t^h \mid \Lambda'_t)$$

may be computed and back propagated, to update the substitute QF settings $$\Lambda'_t.$$

This process may be repeated for each iteration thereon. After a number of J iterations (e.g., when reaching a maximum iteration number or when the gradient update satisfies a stop criterion). The updates to the gradient of the target loss as well as the number of iterations in the system may be prefixed or may adaptively change according based on input data.

After completion of J iterations, the system may output the final substitute QF settings $$\Lambda'_t$$

and the final enhanced $$\hat{x}_t^h$$

computed based on input $\hat{x}_t$ and the final substitute QF settings $$\Lambda'_t.$$

The final substitute QF settings $$\Lambda'_t$$

may be sent to the decoder side. In some embodiments, the final substitute QF settings $$\Lambda'_t$$

may be further compressed through quantization and entropy encoding.

A decoder of the Substitutional Meta-NNLF method may perform a process similar to the decoding framework described herein, for example, in FIG. 4, with one of the differences being that the substitute QF settings $$\Lambda'_t$$

may be used instead of the original QF settings $\Lambda_t$. In some embodiments, the final substitute QF settings $$\Lambda'_t$$

may be further compressed through quantization and entropy encoding and sent to the decoder. The decoder may recover the final substitute QF settings $$\Lambda'_t$$

from the bitstream through entropy decoding and dequantization.

Figure 7:
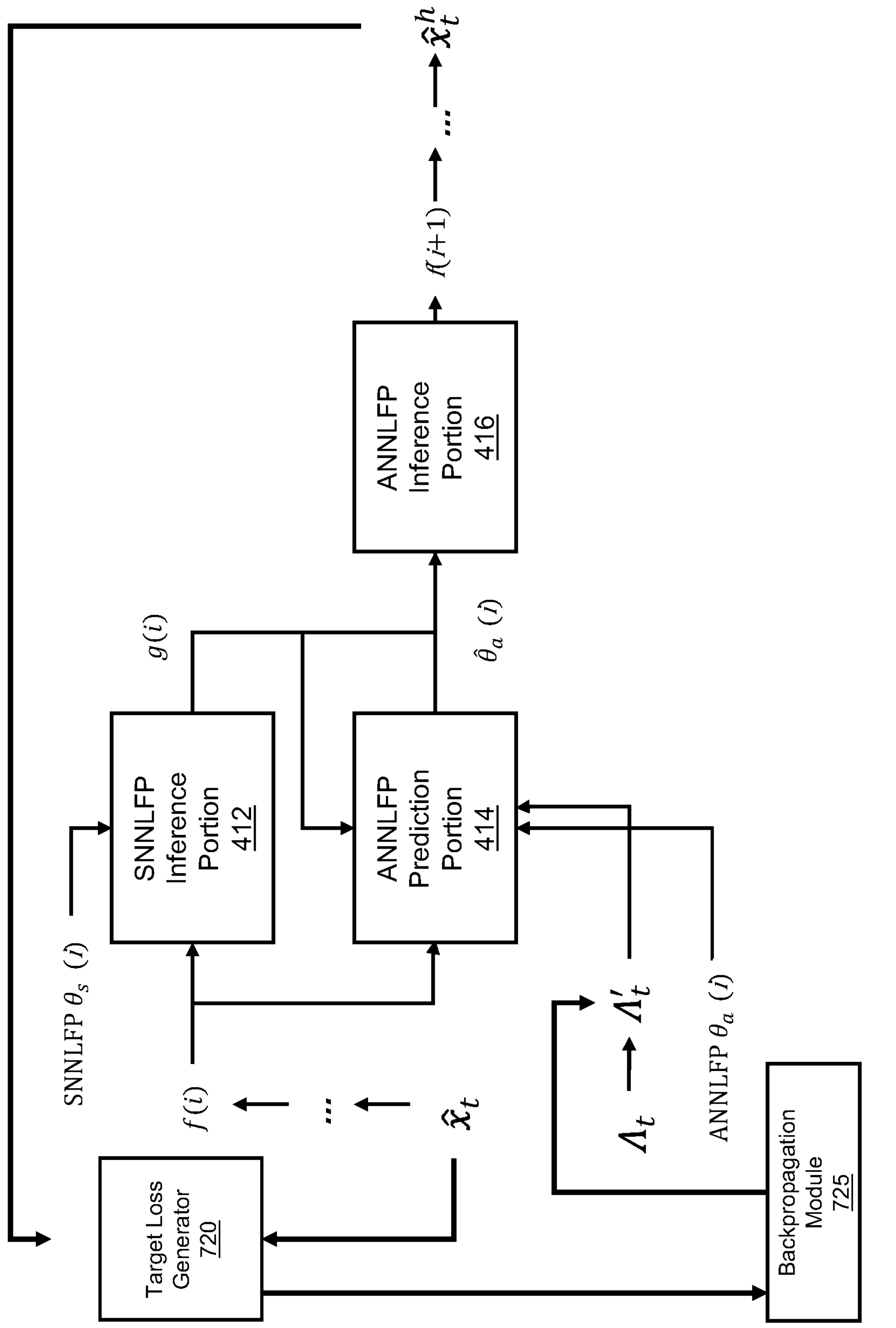
FIG. 7 is a block diagram of an apparatus for Meta-NNLF model for video enhancement using Meta learning, according to embodiments.

FIG. 7 is a block diagram of an apparatus 700 for Meta-NNLF for video enhancement using Meta learning, during a test stage, according to embodiments.

FIG. 7 shows an overall workflow of the encoding stage of the Meta-NNLF.

According to an embodiment of the present disclosure, let $\hat{x}_t$ and $$\Lambda_t'$$

be the input data (video data) and the one or more original QF settings respectively. The apparatus 700 may compute the enhanced $$\hat{x}_t^h$$

using the processing workflow described in herein, for example, in FIG. 4, based on the SNNLFP $\theta_s(i)$ and ANNLFP $\theta_a(i)$, i=1, . . . , N for the Meta-NNLF model, as well as the ANNLFP Prediction NN (with model parameters $\Phi$), by using the substitute QF settings $$\Lambda_t'$$

instead of the QF settings $\Lambda_t$.

The substitute QF settings $$\Lambda_t'$$

may be obtained through an iterative online learning according to an exemplary embodiment. The substitute QF settings $$\Lambda_t'$$

may be initialized as the original QF settings $\Lambda_t$. In each online learning iteration, based on the computed enhanced $$\hat{x}_t^h$$

and the original input $\hat{x}_t$, a target loss $$L(\hat{x}_t, \hat{x}_t^h \mid \Lambda_t')$$

may be computed by the target loss generator 720. The target loss may comprise a distortion loss $$D(\hat{x}_t, \hat{x}_t^h \mid \Lambda_t')$$

and some other regularization loss (e.g., auxiliary loss to ensure natural visual qualities of the enhanced $$\hat{x}_t^h).$$

Any distortion measurement metrics, e.g., MSE, MAE, SSIM, etc., may be used as $$D(\hat{x}_t, \hat{x}_t^h \mid \Lambda_t').$$

The gradient of the target loss $$L(\hat{x}_t, \hat{x}_t^h \mid \Lambda_t')$$

may be computed and back propagated by the backpropagation module 725, to update the substitute QF settings $$\Lambda_t'.$$

This process may be repeated for each iteration thereon. After a number of J iterations (e.g., when reaching a maximum iteration number or when the gradient update satisfies a stop criterion). The updates to the gradient of the target loss as well as the number of iterations in the system may be prefixed or may adaptively change according based on input data.

After completion of J iterations, the system may output the final substitute QF settings $$\Lambda_t'$$

and the final enhanced $$\hat{x}_t^h$$

computed based on input $\hat{x}_t$ and the final substitute QF settings $$\Lambda_t'.$$

The final substitute QF settings $$\Lambda_t'$$

may be sent to the decoder side. In some embodiments, the final substitute QF settings $$\Lambda_t'$$

may be further compressed through quantization and entropy encoding.

Figure 8:
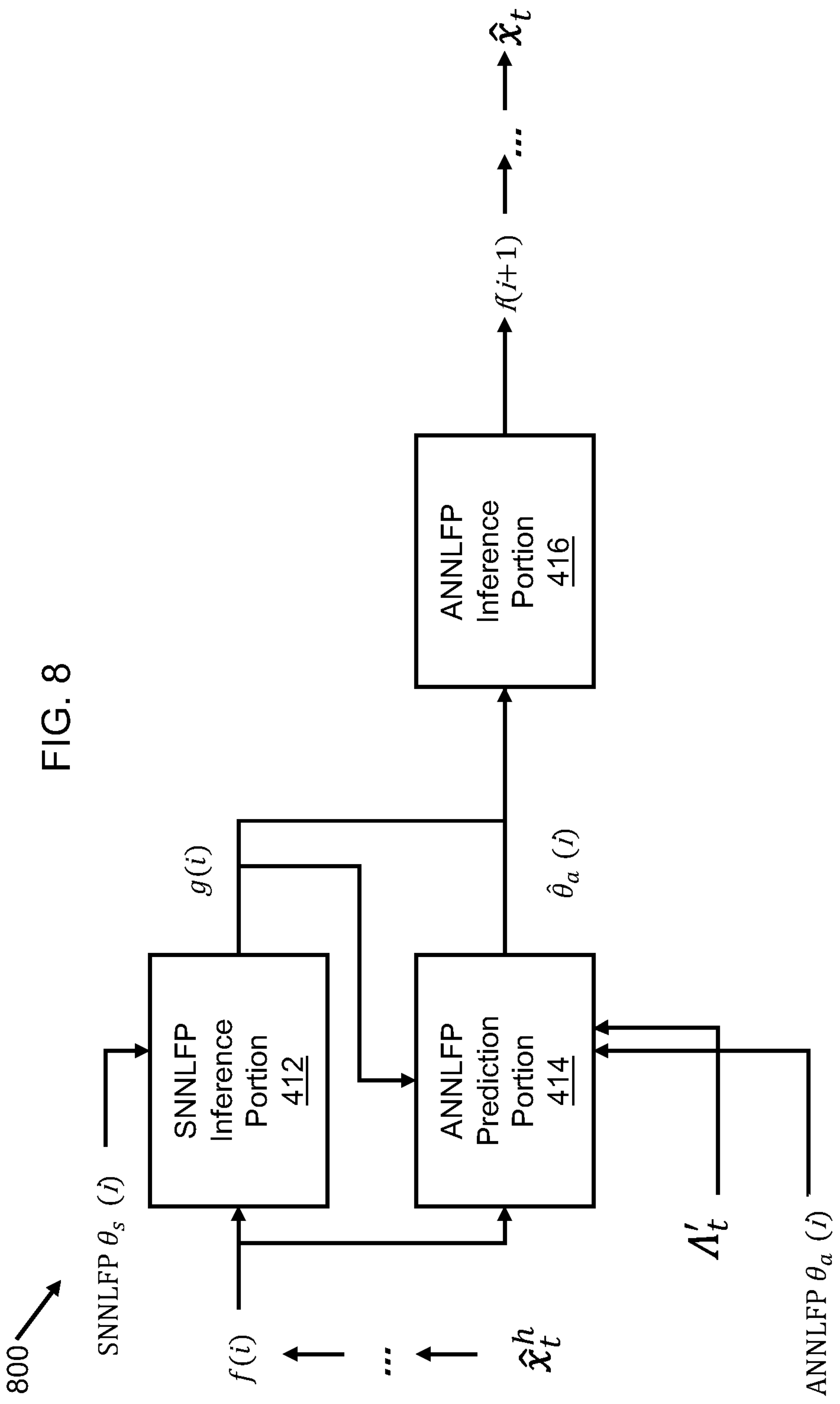
FIG. 8 is a block diagram of an apparatus for Meta-NNLF model for video enhancement using Meta learning, according to embodiments.

FIG. 8 is a block diagram of an apparatus 800 for Meta-NNLF for video enhancement using Meta learning, during a test stage, according to embodiments.

FIG. 8 shows an overall workflow of the decoding stage of the Meta-NNLF.

A decoding process 800 of the Substitutional Meta-NNLF method may be similar to the decoding framework described herein, for example, in FIG. 4, with one of the differences being that the substitute QF settings $$\Lambda_t'$$

may be used instead of the original QF settings $\Lambda_t$. In some embodiments, the final substitute QF settings $$\Lambda_t'$$

may be further compressed through quantization and entropy encoding and sent to the decoder. The decoder may recover the final substitute QF settings $$\Lambda_t'$$

from the bitstream through entropy decoding and dequantization.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

In some implementations, one or more process blocks of FIG. 6 may be performed by the platform 120. In some implementations, one or more process blocks of FIG. 6 may be performed by another device or a group of devices separate from or including the platform 120, such as the user device 110.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations may include each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for video enhancement based on neural network based loop filtering using meta learning, the method being executed by at least one processor, the method comprising:

receiving input video data comprising a plurality of images and one or more original quality control factors;

generating, for each image of the plurality of images, one or more substitute quality factors via a plurality of iterations using the one or more original quality control factors, wherein the one or more substitute quality factors are a modified version of the one or more original quality control factors and are associated with a single instance of an encoding neural network loop filtering model, wherein the one or more substitute quality factors comprise Coding Tree Unit (CTU) partition, Quantization Parameter (QP), deblocking filter boundary strength, and Coding Unit (CU) intra prediction model;

determining the encoding neural network loop filtering model comprising neural network based loop filter parameters and a plurality of layers, wherein the neural network based loop filter parameters include shared parameters and adaptive parameters;

generating enhanced video data, based on the one or more substitute quality factors and the input video data, using the encoding neural network loop filtering model; and transmitting, over a network, the enhanced video data and the one or more substitute quality factors to a decoder, wherein the decoding of the enhanced video data to obtain a reconstructed input video is based on the one or more substitute quality factors instead of the one or more original quality control factors, wherein the generating the enhanced video data comprises:

for each of the plurality of layers in the encoding neural network loop filtering model:

generating shared features based on an output from a previous layer, using a first shared neural network loop filter having first shared parameters;

computing estimated adaptive parameters, based on the output from the previous layer, the shared features, first adaptive parameters from a first adaptive neural network loop filter, and the one or more substitute quality factors, using a prediction neural network; and generating an output for a current layer, based on the shared features and the estimated adaptive parameters; and generating the enhanced video data, based on an output of a last layer of the encoding neural network loop filtering model.

2. The method of claim 1, wherein generating the one or more substitute quality factors comprises:

for each of the plurality of iterations:

computing a target loss based on the enhanced video data and the input video data;

computing a gradient of the target loss using back-propagation; and updating the one or more substitute quality factors based on the gradient of the target loss.

3. The method of claim 2, wherein a first iteration of generating the one or more substitute quality factors comprises initializing the one or more substitute quality factors as the one or more original quality control factors prior to the computing of the target loss.

4. The method of claim 1, wherein a number of iterations in the plurality of iterations is based on a pre-determined maximum number of iterations.

5. The method of claim 1, wherein a number of iterations in the plurality of iterations is adaptively based on the received video data and the encoding neural network loop filtering model.

6. The method of claim 2, wherein a number of iterations in the plurality of iterations is based on the updating of the one or more substitute quality factors until a predetermined condition is satisfied.

7. The method of claim 2, wherein a last iteration of generating the one or more substitute quality factors comprises updating the one or more substitute quality factors to one or more final substitute quality control factors.

8. An apparatus comprising:

at least one memory configured to store program code; and at least one processor configured to read the program code and operate as instructed by the program code, the program code comprising:

receiving code configured to cause the at least one processor to receive input video data comprising a plurality of images and one or more original quality control factors;

first generating code configured to cause the at least one processor to generate, for each image of the plurality of images, one or more substitute quality factors via a plurality of iterations using the one or more original quality control factors, wherein the one or more substitute quality factors are a modified version of the one or more original quality control factors and are associated with a single instance of an encoding neural network loop filtering model, wherein the one or more substitute quality factors comprise Coding Tree Unit (CTU) partition, Quantization Parameter (QP), deblocking filter boundary strength, and Coding Unit (CU) intra prediction model;

first determining code configured to cause the at least one processor to determine the encoding neural network loop filtering model comprising neural network based loop filter parameters and a plurality of layers, wherein the neural network based loop filter parameters include shared parameters and adaptive parameters;

second generating code configured to cause the at least one processor to generate enhanced video data, based on the one or more substitute quality factors and the input video data, using the encoding neural network loop filtering model; and transmitting code configured to cause the at least one processor to transmit, over a network, the enhanced video data and the one or more substitute quality factors to a decoder, wherein the decoding of the enhanced video data to obtain a reconstructed input video is based on the one or more substitute quality factors instead of the one or more original quality control factors, wherein the second generating code comprises:

for each of the plurality of layers in the encoding neural network loop filtering model:

third generating code configured to cause the at least one processor to generate shared features based on an output from a previous layer, using a first shared neural network loop filter having first shared parameters;

first computing code configured to cause the at least one processor to compute estimated adaptive parameters, based on the output from the previous layer, the shared features, first adaptive parameters from a first adaptive neural network loop filter, and the one or more substitute quality factors, using a prediction neural network; and fourth generating code configured to cause the at least one processor to generate an output for a current layer, based on the shared features and the estimated adaptive parameters; and fifth generating code configured to cause the at least one processor to generate the enhanced video data, based on an output of a last layer of the encoding neural network loop filtering model.

9. The apparatus of claim 8, wherein the first generating code comprises:

for each of the plurality of iterations:

computing a target loss based on the enhanced video data and the input video data;

computing a gradient of the target loss using back-propagation; and updating the one or more substitute quality factors based on the gradient of the target loss.

10. The apparatus of claim 9, wherein a first iteration of the plurality of iterations comprises initializing the one or more substitute quality factors as the one or more original quality control factors prior to the computing of the target loss.

11. The apparatus of claim 8, wherein a number of iterations in the plurality of iterations is based on a pre-determined maximum number of iterations.

12. The apparatus of claim 8, wherein a number of iterations in the plurality of iterations is adaptively based on the received video data and the encoding neural network loop filtering model.

13. The apparatus of claim 9, wherein a number of iterations in the plurality of iterations is based on the updating of the one or more substitute quality factors until a predetermined condition is satisfied.

14. The apparatus of claim 9, wherein a last iteration of the plurality of iterations comprises updating the one or more substitute quality factors to one or more final substitute quality control factors.

15. A non-transitory computer-readable medium storing instructions that, when executed by at least one processor, causes the at least one processor to:

receive input video data comprising a plurality of images and one or more original quality control factors;

generate one or more substitute quality factors via a plurality of iterations using the one or more original quality control factors, wherein the one or more substitute quality factors are a modified version of the one or more original quality control factors and are associated with a single instance of an encoding neural network loop filtering model, wherein the one or more substitute quality factors comprise Coding Tree Unit (CTU) partition, Quantization Parameter (QP), deblocking filter boundary strength, and Coding Unit (CU) intra prediction model;

determine the encoding neural network loop filtering model comprising neural network based loop filter parameters and a plurality of layers, wherein the neural network based loop filter parameters include shared parameters and adaptive parameters;

generate enhanced video data, based on the one or more substitute quality factors and the input video data, using the encoding neural network loop filtering model; and transmit, over a network, the enhanced video data and the one or more substitute quality factors to a decoder, wherein the decoding of the enhanced video data to obtain a reconstructed input video is based on the one or more substitute quality factors instead of the one or more original quality control factors, wherein generating the enhanced video data comprises:

for each of the plurality of layers in the encoding neural network loop filtering model:

generating shared features based on an output from a previous layer, using a first shared neural network loop filter having first shared parameters;

computing estimated adaptive parameters, based on the output from the previous layer, the shared features, first adaptive parameters from a first adaptive neural network loop filter, and the one or more substitute quality factors, using a prediction neural network; and generating an output for a current layer, based on the shared features and the estimated adaptive parameters; and generating the enhanced video data, based on an output of a last layer of the encoding neural network loop filtering model.

16. The non-transitory computer-readable medium of claim 15, wherein the generating the one or more substitute quality factors comprises:

for each of the plurality of iterations:

computing a target loss based on the enhanced video data and the input video data;

computing a gradient of the target loss using back-propagation; and updating the one or more substitute quality factors based on the gradient of the target loss.

17. The non-transitory computer-readable medium of claim 16, wherein a first iteration of generating the one or more substitute quality factors comprises initializing the one or more substitute quality factors as the one or more original quality control factors prior to the computing of the target loss.

18. The non-transitory computer-readable medium of claim 16, wherein a last iteration of generating the one or more substitute quality factors comprises updating the one or more substitute quality factors to one or more final substitute quality control factors.

* * * * *